United States Patent [19]
Wang

[11] Patent Number: 5,501,502
[45] Date of Patent: Mar. 26, 1996

[54] FOLDABLE VEHICLE COVER

[76] Inventor: Sheng-Feng Wang, 58, Ma Yuan West St., Taichung, Taiwan

[21] Appl. No.: 390,302

[22] Filed: Jan. 3, 1995

[51] Int. Cl.[6] .................................................... B60J 11/00
[52] U.S. Cl. ........................................ 296/136; 135/88.05
[58] Field of Search ......................... 296/136; 135/88.01, 135/88.05, 88.07; D12/401, 403

[56] References Cited

U.S. PATENT DOCUMENTS

| | | | |
|---|---|---|---|
| 4,402,544 | 9/1983 | Artim et al. | 135/88.05 |
| 5,013,079 | 5/1991 | Ho | 296/136 |
| 5,015,029 | 5/1991 | Kramer | 296/180.1 |
| 5,303,972 | 4/1994 | Heider et al. | 296/98 |

FOREIGN PATENT DOCUMENTS

| | | | |
|---|---|---|---|
| 74422 | 7/1952 | Denmark | 296/136 |
| 3816475 | 11/1989 | Germany | 296/136 |

Primary Examiner—Dennis H. Pedder

[57] ABSTRACT

A cover for covering a vehicle includes a frame secured to the vehicle and having a flange formed on the upper portion. A number of panels each includes two free ends pivotally coupled to the free ends of the frame and each includes a lower flange for engaging with the flange of the frame. The panels each includes an upper flange for engaging with the lower flange so as to form a nested group of arch shaped configuration for covering and for protecting the vehicle. The panels may be rotated by a motor and may form an anti-theft device for the vehicles.

3 Claims, 9 Drawing Sheets

FOLDABLE VEHICLE COVER

BACKGROUND OF THE INVENTION

1. Field of the Invention

The present invention relates to a cover, and more particularly to a protective cover for vehicles.

2. Description of the Prior Art

Typical protective covers for vehicles comprise a frame or a skeleton that is required to be attached to the vehicle manually when required, and a cover or a tent is required to be further attached to the frame manually for covering the vehicles and for protecting the vehicles from sun shine. This is inconvenient such that most of the drivers do not like to use the protective covers.

The present invention has arisen to mitigate and/or obviate the afore-described disadvantages of the conventional protective covers for vehicles.

SUMMARY OF THE INVENTION

The primary objective of the present invention is to provide a protective cover for vehicles in which the protective cover may be operated automatically without manual force.

In accordance with one aspect of the invention, there is provided a cover for a vehicle comprising a frame for securing to the vehicle, the frame including a substantially U-shaped configuration having two free ends, the frame including an upper portion having a first engaging means provided thereon, a plurality of substantially U-shaped panels including two free ends pivotally coupled to the free ends of the frame, the panels including an innermost panel located beside the frame and including an outermost panel, the panels each including a lower portion having a second engaging means provided thereon, the second engaging means of the innermost panel being engaged with the first engaging means for limiting rotational movement of the innermost panel, the panels each including an upper portion having a third engaging means for engaging with the second engaging means so as to limit rotational movement of the panels, a cap engaged beside the outermost panel and including two free ends pivotally coupled to the free ends of the panels, the cap including a lower portion having a fourth engaging means for engaging with the third engaging means of the outermost panel and for rotating the panels so as to form a nested group of arch shaped configuration for covering and for protecting the vehicle.

The frame, the panels and the cap each comprises two legs including a middle portion having an arched portion formed thereon for aligning with wheels of the vehicle and for reaching the wheels.

A rotating means is further provided for rotating the cap so as to form the cover. The rotating means includes a motor having an axle engaged with and secured to the cap so as to rotate the cap. The free ends of the cap each includes a hole having a plurality of teeth formed therein, the axle of the motor includes a pinion secured thereto for engaging with the teeth of the hole so as to rotate the cap. The cover also form an anti-theft device for the vehicles.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
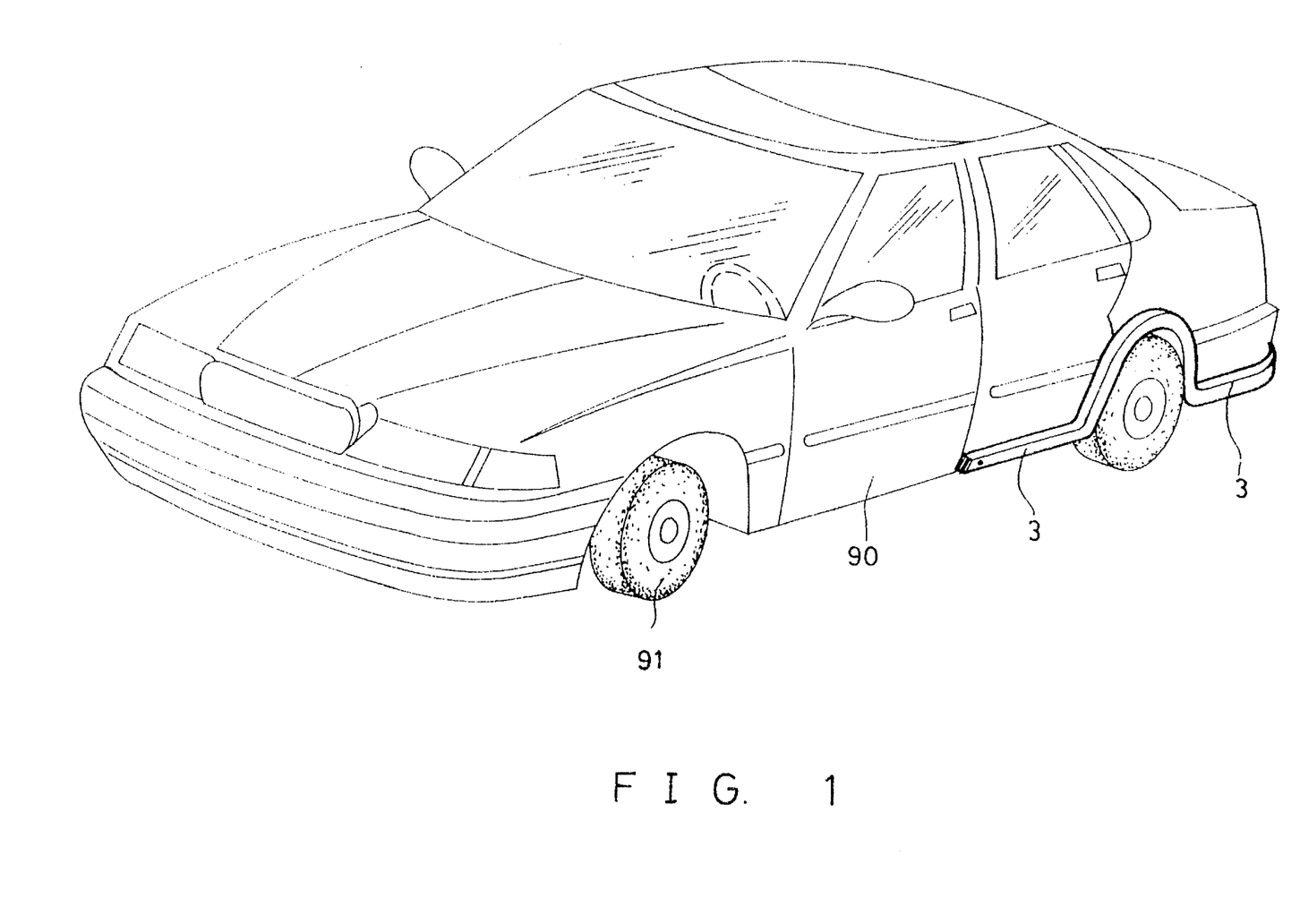
FIG. 1 is a perspective view of a vehicle having a protective cover in accordance with the present invention, in which the protective cover is in a folded configuration.
Figure 1A:
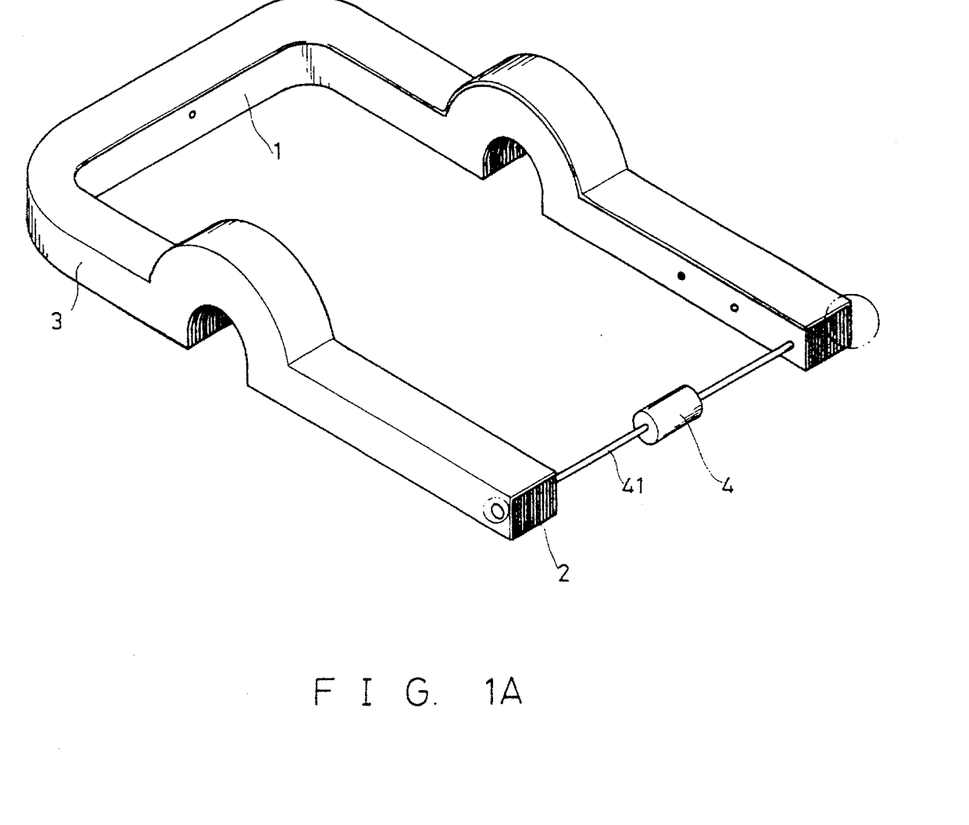
FIG. 1A is a perspective view of the protective cover in folded configuration.
Figure 2:
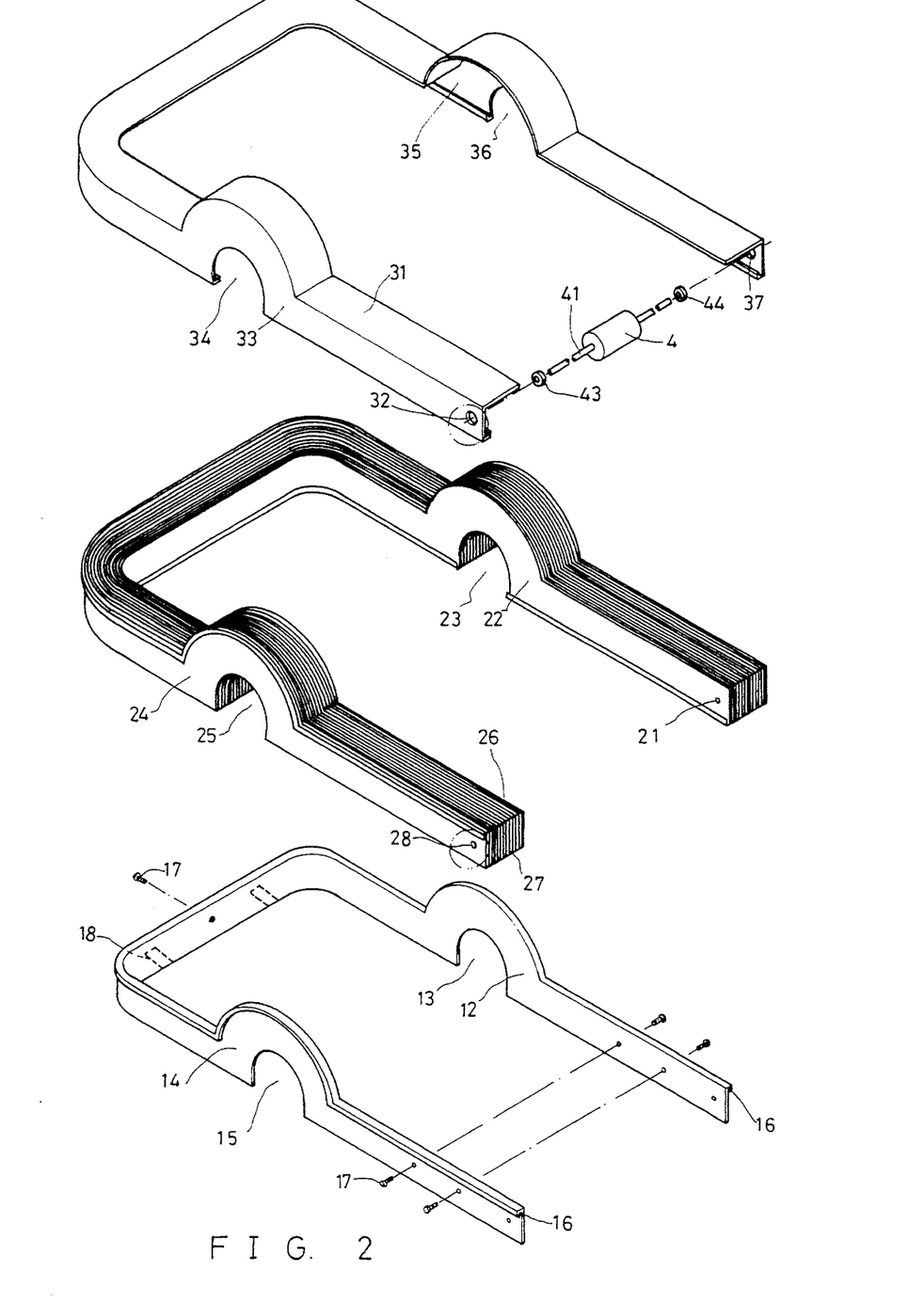
FIG. 2 is an exploded view of the protective cover.

Referring to the drawings, and initially to FIGS. 1, 1A and 2, a protective cover in accordance with the present invention is substantially U-shaped including two free ends pivotally coupled to the middle portion of the vehicle 90 on the underside thereof. The protective cover comprises a U-shaped frame 1 fixed to the vehicle by screws 17. The frame 11 includes a middle portion having two projections 18 extended therefrom and includes a pair of parallel legs each having an arched portion 12, 14 formed in the middle portion so as to form an opening 13, 15 for reaching to the wheels 91 of the vehicle 90. The frame 11 includes an engaging flange 16 extended laterally outward from the upper peripheral portion thereof.

Figure 2A:
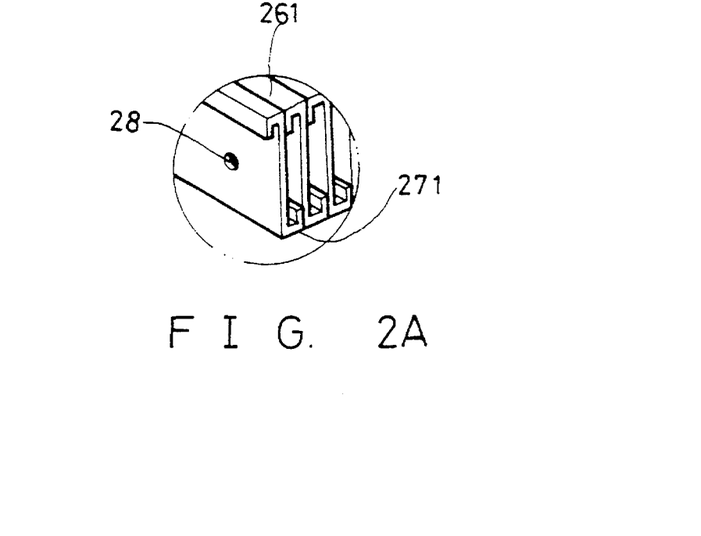
FIGS. 2A, 2B, 2C are schematic views showing portions of the protective cover.
Figure 2B:
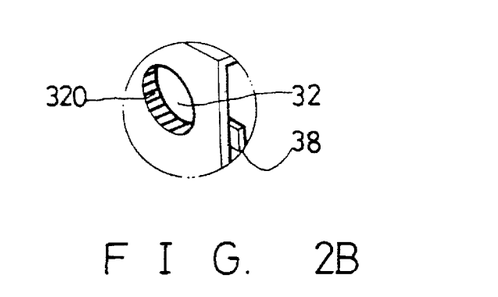
Figure 2C:
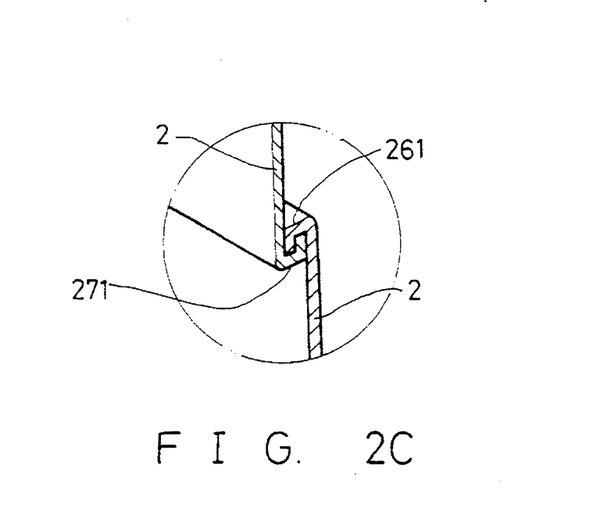

A number of panels 2 have a shape identical to that of the frame 1 for engaging on the outer side of the frame 1 and for aligning with the frame 1. The panels 2 each includes a pair of parallel legs each having an arched portion 22, 24 formed in the middle portion so as to form an opening 23, 25 for aligning with the openings 13, 15 of the frame 1 and for reaching to the wheels 91 of the vehicle 90. The free ends of the legs each includes a hole 21, 28 formed therein. The panels 2 each includes an upper edge having an engaging flange 261 (FIG. 2A) extended laterally outward from the upper portion 26 and having another engaging flange 271 laterally extended inward from the lower portion 27 for engaging with the engaging flanges 261 respectively (FIG. 2C). The engaging flange 16 of the frame 1 may be engaged with the engaging flange 271 of the innermost panel 2 and the flanges 261 may be engaged with the flanges 271 such that the A cap 3 also includes a shape similar to that of the frame 1 and that of the panels 2 and also includes two legs each having an arched portion 33, 35 formed in the middle portion so as to form an opening 34, 36 for aligning with the openings 13, 23, 15, 25 and for reaching to the wheels 91 of the vehicle 90. The legs each includes a free end having an orifice 32, 37 formed therein. The orifices 32, 37 each includes a number of teeth 320 formed therein (FIG. 2B). The cap 3 includes a plate 31 extended laterally inward for covering and for protecting the panels 2 and the frame 1, and includes an engaging flange 38 extended laterally inward (FIG. 2B) for engaging with the outward flange 261 of the outermost panel 2. The projections 18 are provided for engaging with the cap 3 so as to limit the movement of the cap 3.

Figure 5:
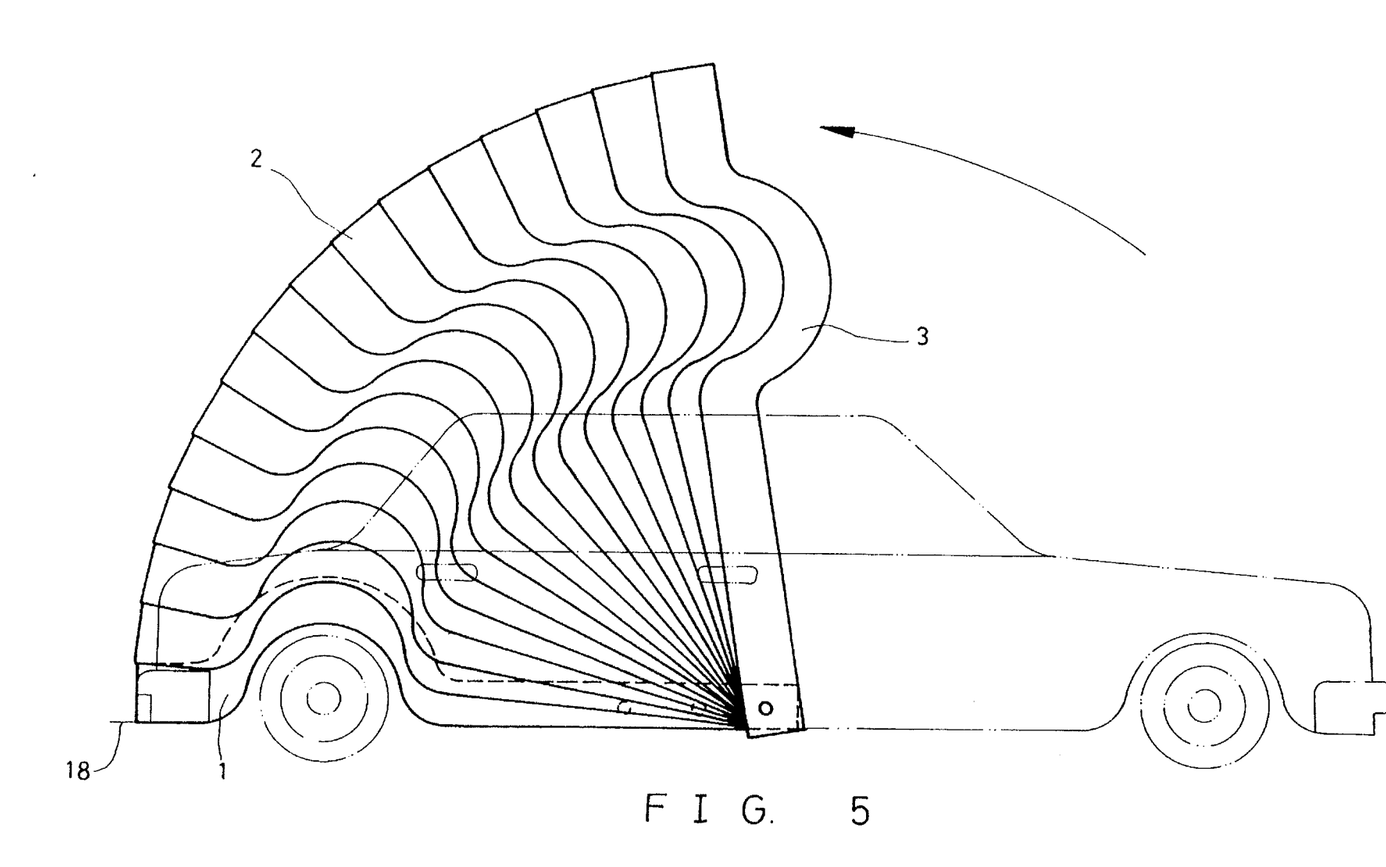
FIGS. 5, 6, 7 are schematic views illustrating the operations of the protective cover.
Figure 6:
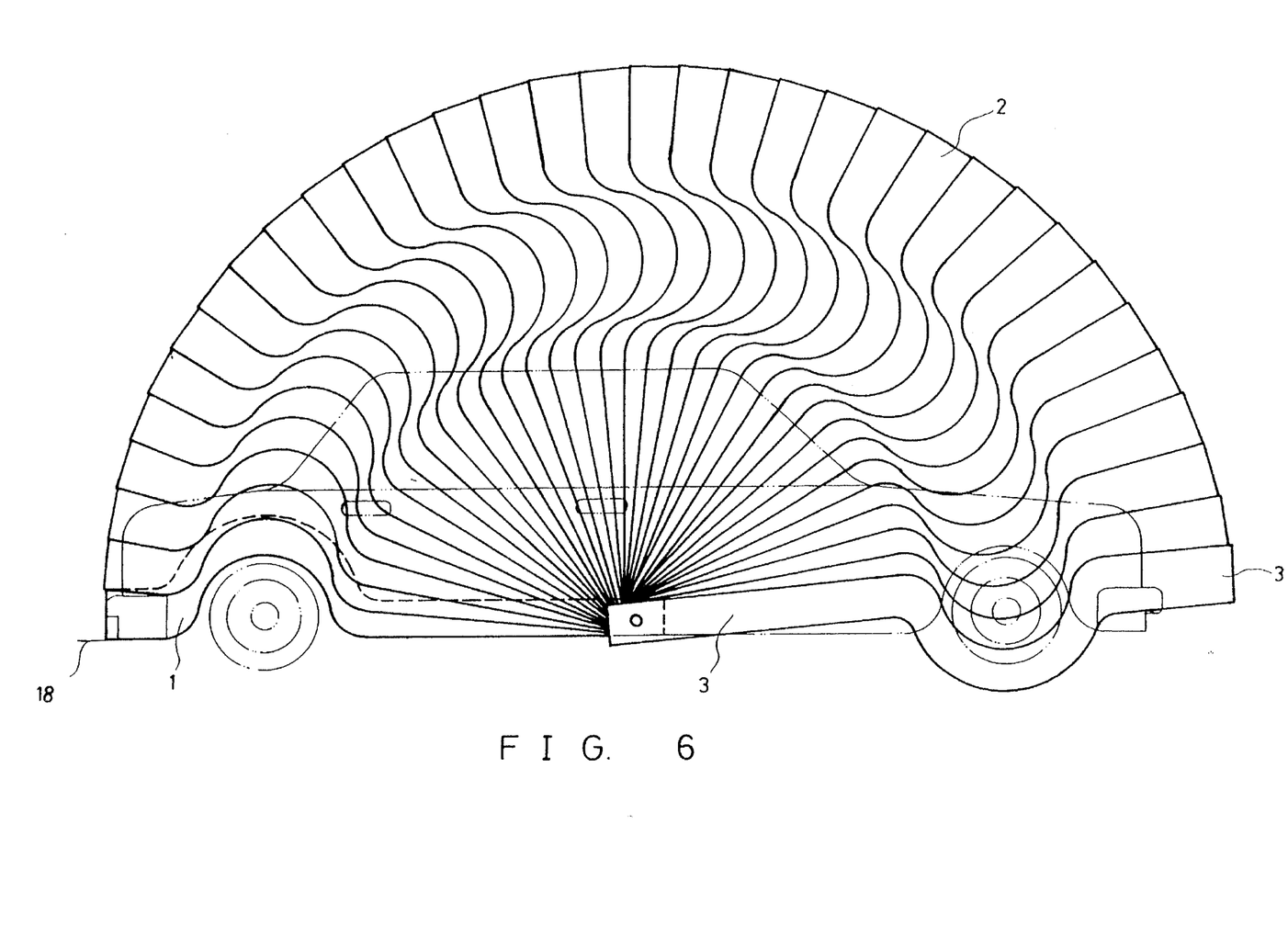
Figure 7:
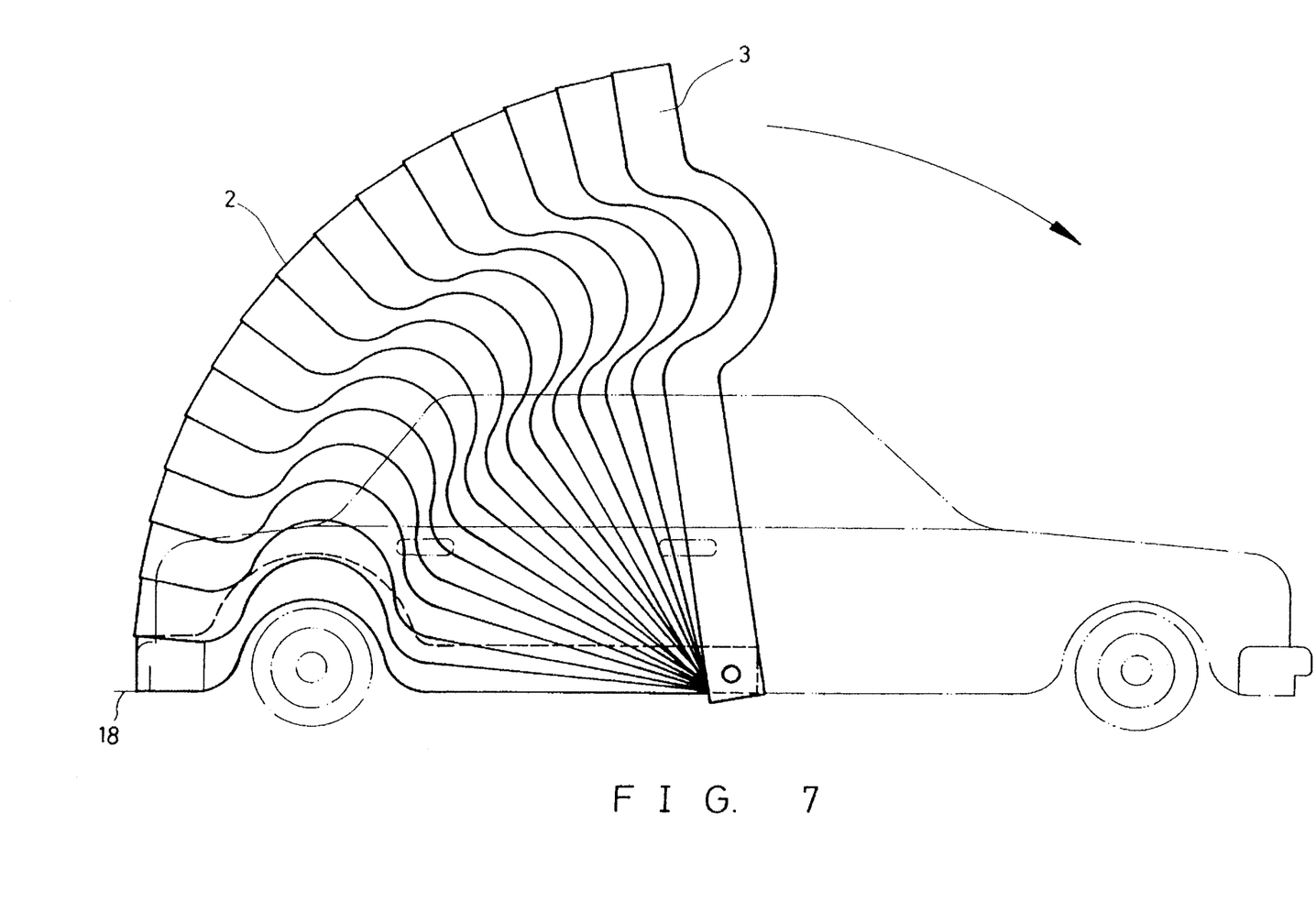

In operation, the engaging flange 16 of the frame 1 may be engaged with the engaging flange 271 of the innermost panel 2; the flanges 261 may be engaged with the flanges 271; and the flange 38 of the cap 3 may be engaged with the flange 261 of the outermost panel 2 such that the panels 2 may be engaged with each other so as to form a nested group of arch shaped configuration for covering the vehicle when the cap 3 is rotated relative to the frame 1, best shown in FIGS. 5 to 7.

Figure 3:
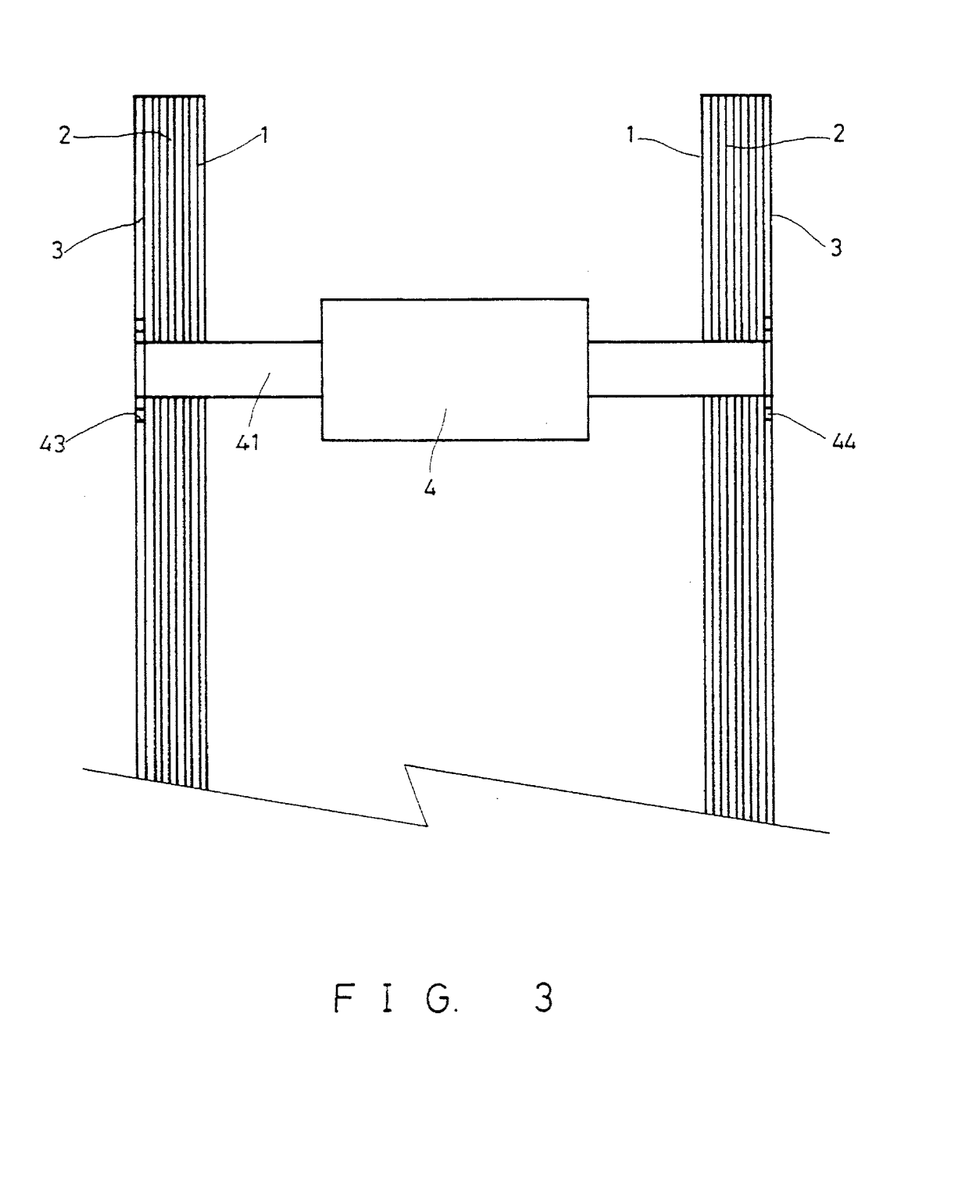
FIG. 3 is a partial cross sectional view showing the driving means for the protective cover.

Referring next to FIG. 3, and again to FIGS. and 2, a motor 4 includes an axle 41 extended outward from both ends thereof and engaged through the free ends of the frame 1 and the holes 21, 28 of the panels 2. Two pinions 43, 44 are fixed to the free ends of the axle 41 and engaged with the teeth of the orifices 32, 37 of the cap such that the cap 3 can be rotated by the motor 4 so as to form the nested group of arch shaped configuration for covering the vehicle (FIGS. 5 to 7).

Figure 4:
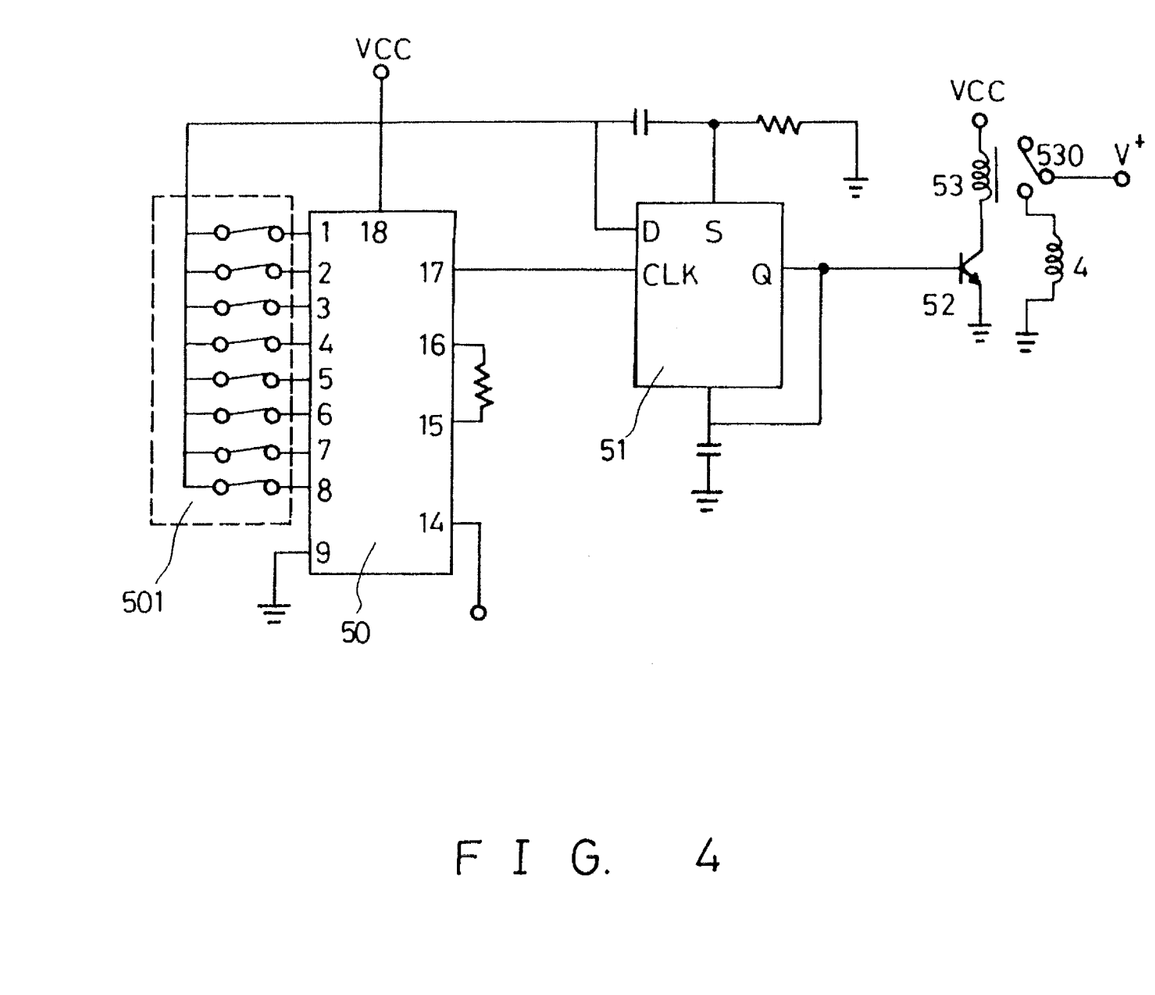
FIG. 4 is an electric diagram of the remote control device for the protective cover.

Referring next to FIG. 4, illustrated is a remote control device for the protective cover. The remote control device comprises a decoder 50 and a flip-flop 51. The decoder 50 includes nine contacts 1–9 coupled to switches 501, a contact 14 for receiving signals, a contact 17 coupled to the clock CLK of the flip-flop 51. The flip-flop 51 has a contact Q coupled to a transistor 52, a relay 53 is coupled to the base of the transistor 52, and the switch 530 of the relay 53 is coupled to the electric power source and coupled to the motor 4 for controlling the motor 4 when the decoder 50 receiving an actuating signal.

It is to be noted that the panels and the cap may be made of metal materials or composite materials which may suitably covering the vehicle and may form an anti-theft device for the vehicles.

Accordingly, the protective cover in accordance with the present invention can be easily operated automatically without manual force.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A foldable vehicle cover comprising:

a frame securing a vehicle, said frame including a substantially U-shaped configuration having two free ends and an upper portion which has a first engaging means provided thereon;

a plurality of substantially U-shaped panels including two free ends pivotally coupled to said free ends of said frame, said panels including an innermost panel located beside said frame and including an outermost panel, each of said panels including a lower portion having a second engaging means provided thereon, said second engaging means of said innermost panel being engaged with said first engaging means for limiting rotational movement of said innermost panel, each of said panels including an upper portion having a third engaging means for engaging with said second engaging means to limit rotational movement of said panels;

a cap engaged beside said outermost panel and including two free ends pivotally coupled to said free ends of said panels, said cap including a lower portion having a fourth engaging means for engaging with said third engaging means of said outermost panel and for rotating said panels to form a nested group of arch shaped configuration for covering and for protecting said vehicle; and each of said frame, said panels and said cap comprising two legs including a middle portion having an arched portion formed thereon for aligning with wheels of said vehicle.

2. A foldable vehicle cover as claimed in claim 1, wherein a rotating means including a motor having an axle engaged with and secured to said cap to rotate said cap.

3. A foldable vehicle cover as claimed in claim 2, wherein each of said free ends of said cap includes a hole having a plurality of teeth formed therein, and said axle of said motor includes a pinion secured thereto for engaging with said teeth of said hole to rotate said cap.

* * * * *